United States Patent
Yokono et al.

(10) Patent No.: US 10,803,398 B2
(45) Date of Patent: Oct. 13, 2020

(54) APPARATUS AND METHOD FOR INFORMATION PROCESSING

(71) Applicant: SONY CORPORATION, Tokyo (JP)

(72) Inventors: Jun Yokono, Tokyo (JP); Yoshiaki Iwai, Tokyo (JP); Ryuichi Nawa, Saitama (JP)

(73) Assignee: SONY CORPORATION, Tokyo (JP)

( * ) Notice: Subject to any disclaimer, the term of this patent is extended or adjusted under 35 U.S.C. 154(b) by 964 days.

(21) Appl. No.: 14/509,304

(22) Filed: Oct. 8, 2014

(65) Prior Publication Data
US 2015/0120624 A1 Apr. 30, 2015

(30) Foreign Application Priority Data

Oct. 30, 2013 (JP) ................................. 2013-225136

(51) Int. Cl.
*G06N 20/00* (2019.01)
*G06K 9/62* (2006.01)

(52) U.S. Cl.
CPC ........... *G06N 20/00* (2019.01); *G06K 9/6262* (2013.01)

(58) Field of Classification Search
CPC ..... G06N 99/005; G06N 20/00; G06K 9/6262
See application file for complete search history.

(56) References Cited

U.S. PATENT DOCUMENTS

| 2007/0177805 A1* | 8/2007 | Gallagher ......... G06F 17/30265 382/190 |
| 2008/0154807 A1* | 6/2008 | Chow .................. G06K 9/6253 706/12 |
| 2012/0179633 A1* | 7/2012 | Ghani ............... G06F 17/30705 706/12 |

FOREIGN PATENT DOCUMENTS

JP 2006-308535 A 11/2006

OTHER PUBLICATIONS

Sheng, Victor S., Foster Provost, and Panagiotis G. Ipeirotis. "Get another label? improving data quality and data mining using multiple, noisy labelers." Proceedings of the 14th ACM SIGKDD international conference on Knowledge discovery and data mining. ACM, 2008.*

* cited by examiner

*Primary Examiner* — Miranda M Huang
*Assistant Examiner* — Kevin W Figueroa
(74) *Attorney, Agent, or Firm* — Chip Law Group (57) ABSTRACT

Provided is an information processing apparatus including a sorting unit configured to sort a second data set as evaluation data with a classifier generated by learning through supervised learning that uses a first data set as a supervision signal, an input unit configured to receive label correction for the second data set in accordance with a sorting result from the sorting unit, and an update unit configured to update the second data set to reflect the correction received by the input unit.

13 Claims, 7 Drawing Sheets

APPARATUS AND METHOD FOR INFORMATION PROCESSING

CROSS REFERENCE TO RELATED APPLICATIONS

This application claims the benefit of Japanese Priority Patent Application JP 2013-225136 filed Oct. 30, 2013, the entire contents of which are incorporated herein by reference.

BACKGROUND

The present disclosure relates to an apparatus and method for information processing.

In recent years, information processing apparatuses configured to make various determinations by using a dictionary learned by machine learning have been developed. For example, systems configured to use machine learning to sort images by categories of objects, to sort the contents of documents by categories, and/or to monitor manufacturing processes of semiconductors to detect a defect have been developed. In order to enhance the efficiency of such systems, further improvement in machine learning technology is desired.

For example, a technology disclosed in JP No. 2006-308535A includes imaging an identified defect by an operator, determining a failure mode of the defect by visual observation by the operator, and updating discrimination conditions based on the determination result.

SUMMARY

In supervised learning which is a technique of the machine learning, learning is generally performed by using a supervision signal and evaluation data which are sets of pairs of data, such as images, texts and voices, and labels representing the contents of each data. However, since success of learning is dependent on the labels used in the supervised learning, it was difficult to succeed in learning when an error is included in the labels.

Accordingly, the present disclosure proposes a new and modified apparatus and method for information processing which can improve the quality of the labels used for supervised learning.

According to an embodiment of the present disclosure, there is provided an information processing apparatus including a sorting unit configured to sort a second data set as evaluation data with a classifier generated by learning through supervised learning that uses a first data set as a supervision signal, an input unit configured to receive label correction for the second data set in accordance with a sorting result from the sorting unit, and an update unit configured to update the second data set to reflect the correction received by the input unit.

According to another embodiment of the present disclosure, there is provided a method for information processing executed by a processor of an information processing apparatus, the method including sorting a second data set as evaluation data with a classifier generated by learning through supervised learning that uses a first data set as a supervision signal, receiving label correction for the second data set in accordance with a sorting result, and updating the second data set to reflect the received correction.

As described in the foregoing, according to the present disclosure, it is possible to improve the quality of the labels used for supervised learning. It is to be noted that the above-described effect is not necessarily restrictive. Any one of the effects disclosed in this specification or other effects recognizable from this specification may be achieved together with or in place of the above-described effect.

DETAILED DESCRIPTION OF THE EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A description will be given in the following order:
1. Outline of learning apparatus according to embodiment of present disclosure
2. First Embodiment
  2-1. Configuration
  2-2. Operation Processing
    2-2-1. Improvement in quality of data set
    2-2-2. Addition of new data set
3. Conclusion

1. OUTLINE OF LEARNING APPARATUS ACCORDING TO EMBODIMENT OF PRESENT DISCLOSURE

A learning apparatus (information processing apparatus) according to an embodiment of the present disclosure performs learning by supervised learning. Accordingly, the outline of the supervised learning is described first.

The supervised learning is a technique of machine learning in which learning is performed by fitting of data to a teacher set, the teacher set (supervision signal) being a set of pairs of data (sorting objects) and labels relating to the data. Fitting is performed by extracting feature values of the data included in the teacher set, and selecting a feature value for each label, and/or capturing the characteristics of data belonging to each label.

The learning apparatus creates a dictionary (classifier) through the supervised learning that uses the teacher set. The learning apparatus predicts, based on the learned dictionary, labels corresponding to respective pieces of data in an evaluation set (evaluation data), which is a set of pairs of data and labels, different from the teacher set. A higher prediction accuracy indicates more success in learning of the learning apparatus. The prediction accuracy is a matching degree between the labels predicted by the learning apparatus and the labels originally set for the data.

The learning apparatus according to the present embodiment learns by using the teacher set including a large amount of data and labels provided by a user, and then predicts the label of each data included in the evaluation set which is unknown data not used in learning. Hereinafter, a specific example of the supervised learning will be described with reference to FIGS. 1 to 2.

Figure 1:
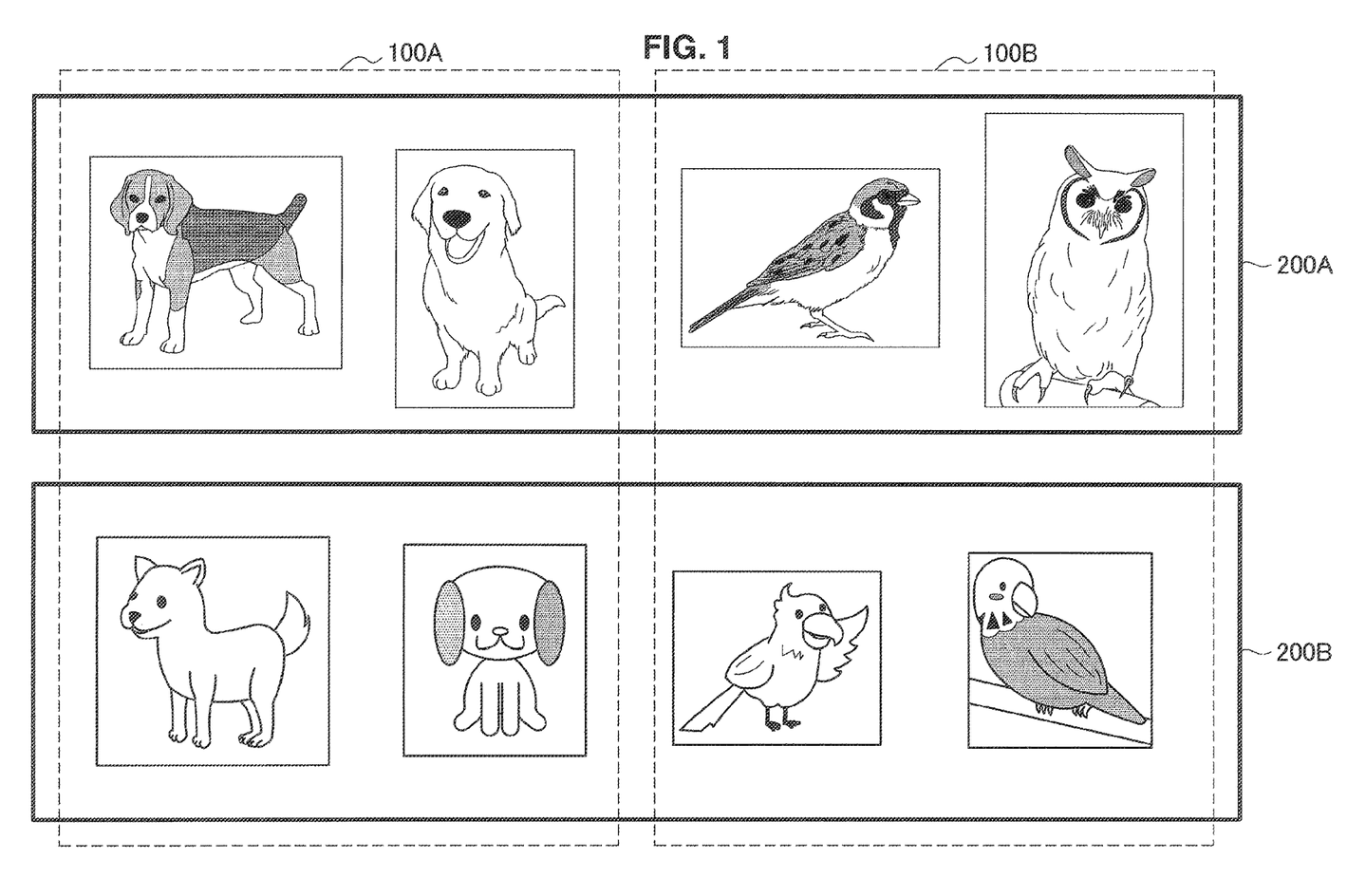
FIG. 1 illustrates an outline of a learning apparatus according to an embodiment of the present disclosure.

FIG. 1 illustrates an outline of a learning apparatus according to an embodiment of the present disclosure. A description is herein given of an example in which the learning apparatus learns by using the images illustrated in FIG. 1 as objects.

The images illustrated in FIG. 1 are sorted into a dog class 100A and a bird class 100B. Accordingly, the user set a label "dog" for the data belonging to the class 100A and a label "bird" for the data belonging to the class 100B, and inputs this data set to the learning apparatus as a teacher set. When the learning apparatus learns such a data set as a teacher set, the learning apparatus can solve a problem of distinction between two classes of "dog" and "bird."

In addition, the data illustrated in FIG. 1 is sorted into a photograph class 200A and an illustration class 200B. Accordingly, the user sets a label "photograph" for the data belonging to the class 200A and a label "illustration" for the data belonging to the class 200B, and inputs this data set to the learning apparatus as a teacher set. When the learning apparatus learns such a data set as a teacher set, the learning apparatus can solve a problem of distinction between two classes of "photograph" and "illustration."

Figure 2:
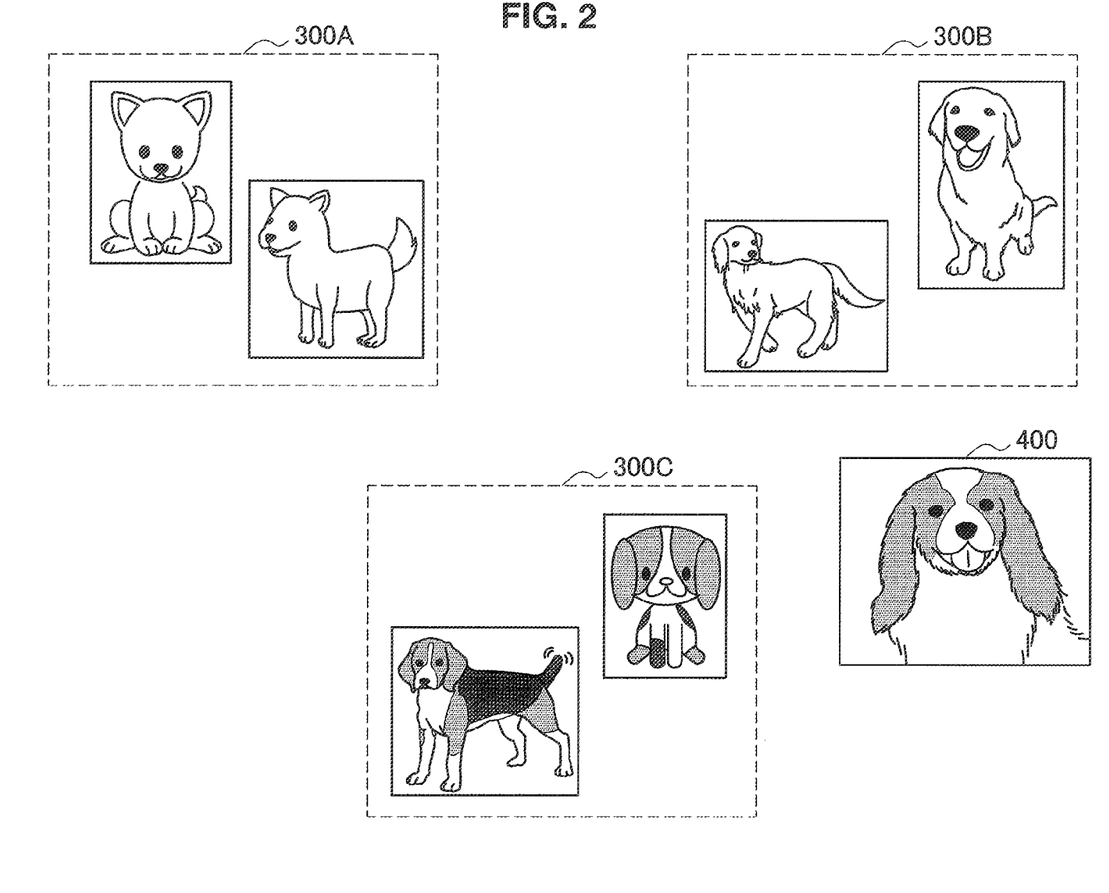
FIG. 2 illustrates an outline of the learning apparatus according to the same embodiment of the present disclosure.

Thus, by setting different labels for the same data, the learning apparatus learns so as to be able to solve different distinction problems. As illustrated in FIG. 2, the learning apparatus can also solve not only a problem of distinction between two classes but also a problem of distinction between three classes.

FIG. 2 illustrates an outline of the learning apparatus according to the same embodiment. The images illustrated in FIG. 2 are classified into classes 300A, 300B, and 300C, the labels of which are set by dog breeds of the dogs included in the images. When the learning apparatus learns such a data set as a teacher set, the learning apparatus can solve a problem of distinction between three classes based on the dog breeds. The learning apparatus can also solve a problem of distinction between three classes or more.

Here, some classes have resemblance in appearance, so that the user may be at a loss of determining which label to set for some of the images. For example, in the example illustrated in FIG. 2, the dog included in an image 400 resembles the dogs included in the class 300B in terms of coat of fur, and also resembles the dogs included in the class 300C in terms of fur pattern. This confuses the user in determination of which label to set for the image 400. Such an intermediate image positioned in the middle of a plurality of classes causes the user to make a contradicted determination with respect to the class of the image. Accordingly, the consistency is lost in the user's criterion for determination so that an incompatible determination may be made, resulting in contradicted level setting. More specifically, if labelling (supervised mapping) of the images which are difficult to determine are performed one by one in preparation of the data set for use as a teacher set or an evaluation set, the images, which are to belong to the same class, may be distributed to a plurality of classes. As an example of such contradicted level setting, there is a case where the user sets a class 300B label for the image 400 while setting a class 300C label for an image of the dog included in the image 400 taken from another angle.

Such a situation where the criterion for determination becomes inconsistent notably occurs when an image continuously shifts in class. For example, identification of defect images in the manufacturing process of a semiconductor is performed based on the size of dust. Since the size of dust changes continuously, it tends to cause a person to make a contradicted determination with respect to the class of intermediate images. This also applies to the case of images of hands which are classified based on angles as well as the case of images of human faces which are classified based on age groups. Such a situation may similarly occur not only in learning that uses images as objects but also in learning that uses other data such as voices and texts.

However, since the learning apparatus tries to sort given data correctly, learning may hardly converge if conflicted user determination is involved in the teacher set. Accordingly, distinction error occurs even with the learned dictionary, which results in lowered prediction accuracy. Furthermore, when conflicted user determination is also involved in the evaluation set, the reliability in the prediction accuracy is also deteriorated. Therefore, in order to enhance the prediction accuracy, it is desirable to use data having consistency of the labels, i.e., high quality data, as the teacher set and the evaluation set.

Accordingly, in consideration of the above-stated circumstances, the learning apparatus according to the present embodiment has been invented. The learning apparatus according to the present embodiment can improve the quality of the labels for use in supervised learning. More specifically, the learning apparatus according to the present embodiment performs learning, evaluation, and re-labeling while alternately exchanging the teacher set and the evaluation set, so that consistency can be imparted to the labels of the teacher set and the evaluation set. Hereinafter, the learning apparatus according to an embodiment of the present disclosure will be described in detail.

2. FIRST EMBODIMENT

[2-1. Configuration]

First, the configuration of a learning apparatus according to the first embodiment will be described with reference to FIG. 3.

Figure 3:
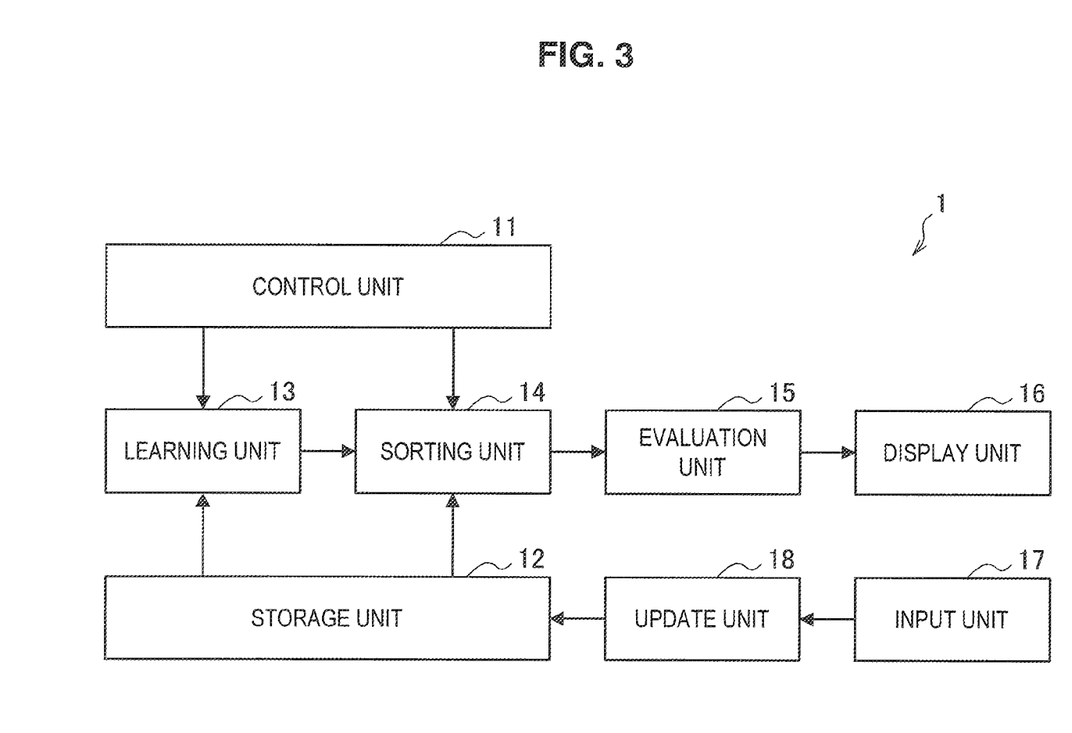
FIG. 3 is a block diagram illustrating an internal configuration of a learning apparatus according to a first embodiment.

FIG. 3 is a block diagram illustrating an internal configuration of the imaging apparatus in the first embodiment. As illustrated in FIG. 1, the learning apparatus 1 has a control unit 11, a storage unit 12, a learning unit 13, a sorting unit 14, an evaluation unit 15, a display unit 16, an input unit 17, and an update unit 18.

(Storage Unit 12)

The storage unit 12 is a portion which performs recording and reproduction of data in a predetermined recording medium. For example, the storage unit 12 is implemented as a hard disc drive (HDD). As the recording medium, various kinds of media may naturally be used, including solid-state memories such as flash memories, memory cards incorporating solid-state memories, optical discs, magneto-optical discs, and hologram memories. The recording medium may have a configuration which can execute recording and reproduction in accordance with the recording medium adopted as the storage unit 12.

For the learning apparatus 1, two data sets (a first data set and a second data set) are prepared, and learning and evaluation are performed by using these two data sets as either a teacher set or an evaluation set. The storage unit 12 according to the present embodiment stores these two data sets used as a teacher set or an evaluation set. The data set used as a teacher set or an evaluation set is a set of data (sorting objects) to which the labels are set. Although the data included in this data set is images (moving images/static images), sounds, texts, and other contents, the data is regarded as images in this specification as an example. Application examples of the learning apparatus 1 configured to target images include various image recognition problems, such as identification of defect images in the manufacturing process of a semiconductor, identification of images of hands classified by angles, and identification of images of human faces classified by age groups. The storage unit 12 stores a set of images having corresponding labels preset by the user, as a data set used as an evaluation set or a teacher set. The storage unit 12 also overwrites the labels updated by the later-described update unit 18.

(Learning Unit 13)

The learning unit 13 has a function to perform learning of a dictionary based on supervised learning that uses the data set stored in the storage unit 12 as a teacher set. Here, the dictionary is a classifier which predicts the labels corresponding to data based on feature values extracted from the data. The dictionary has a parameter to prescribe which feature value is associated with which label. The learning unit 13 determines the parameter by supervised learning so as to minimize an error between preset labels and predicted labels, i.e., the parameter which fits better to the teacher set.

The learning unit 13 can learn based on various feature values. Examples of the feature values include scale-invariant feature transform (SIFT) feature values, histograms of oriented gradient (HOG) feature values, GIST feature values, and color histograms. The learning apparatus 1 is also applicable to sound recognition problems. Examples of sound feature values include fast Fourier transform (FFT) and cepstrum.

The learning unit 13 determines which data to use as a teacher set, out of two data sets stored in the storage unit 12, under the control by the later-described control unit 11. The learning unit 13 outputs the learned dictionary to the sorting unit 14.

(Sorting Unit 14)

The sorting unit 14 sorts the data set stored in the storage unit 12 as an evaluation set by using the dictionary learned by the learning unit 13. Specifically, the sorting unit 14 sorts the data included in the evaluation set based on the dictionary learned by the learning unit 13, and predicts corresponding labels. Here, the sorting unit 14 uses as an evaluation set the data set, out of two data sets stored in the storage unit 12, which is not used as a teacher set during learning by the learning unit 13. The sorting unit 14 determines which data to use as an evaluation set, out of two data sets stored in the storage unit 12, under the control by the later-described control unit 11. The sorting unit 14 outputs to the evaluation unit 15 the labels predicted for respective images included in the evaluation set as a prediction result (sorting result).

(Evaluation Unit 15)

The evaluation unit 15 has a function to compare the labels set for data of the evaluation set and the labels predicted by the sorting unit 14 to evaluate the prediction result from the sorting unit 14. Specifically, the evaluation unit 15 generates a confusion matrix and evaluates whether or not the labels set for the data of the evaluation set match the predicted labels. By using the confusion matrix, the evaluation unit 15 can also deal with a problem of distinction between a large number of classes.

The confusion matrix according to the present embodiment is a table made up of labels preset as an evaluation set and labels predicted by the sorting unit 14, the preset labels being vertically arranged while the predicted labels being horizontal arranged, so as to evaluate prediction accuracy. When the labels are predicted with accuracy of 100%, i.e., all the set labels and the predicted labels match, numerical values are input only in the columns on a diagonal line, while 0 is input in other columns that are the columns outside the diagonal line. However, when learning is performed with use of the teacher set involved in contradicted label setting, contradiction is reflected on the created dictionary. Accordingly, the accuracy in prediction performed by using the dictionary is lowered, so that the numerical values in the portions outside the diagonal line are not equal to 0. The confusion matrix will be described later by taking an example with reference to Tables 1 and 2.

Hereinafter, an image whose set label matches the predicted label is also referred to as a correct image. Hereinafter, an image whose set label is different from the predicted label is also referred to as an incorrect image. The evaluation unit 15 outputs to the display unit 16 the information indicating whether an image included in the evaluation set is a correct image or an incorrect image.

(Display Unit 16)

The display unit 16 has a function as an output unit that outputs the evaluation result from the evaluation unit 15. The display unit 16 may display the information indicating an incorrect image whose set label is different from the label predicted by the sorting unit 14. Since the display unit 16 displays only the incorrect images, the user can efficiently perform later-described label correction as compared with the case where the evaluation results of all the images are displayed. Furthermore, since the display unit 16 does not display correct images, it is possible to prevent the user from performing later-described correction of labels for the images whose set labels are correct, so that the quality of the evaluation set can be maintained.

(Input Unit 17)

The input unit 17 has a function to receive correction of labels for the evaluation set in accordance with the prediction result from the sorting unit 14. Specifically, the input unit 17 receives correction of labels set for data when the labels set for the data in the evaluation set are different from the labels predicted by the sorting unit 14. More specifically, the input unit 17 receives correction of the label set for an incorrect image, the correction being performed by the user who sees the incorrect image displayed by the display unit 16. The user determines whether the prediction of the label performed by the sorting unit 14 regarding the incorrect image displayed on the display unit 16 is erroneous or the preset label is erroneous. If the user determines that the label set for the incorrect image is erroneous, the user inputs to the input unit 17 the correction of the label for the incorrect image. On the contrary, if the user determines that the prediction by the sorting unit 14 is erroneous, the user does not correct the label of the incorrect image.

Images which resemble each other in appearance, such as images of a subject whose appearance changes in a continuous manner, may confuse the user in determination of which label to set. Accordingly, when an image included in the evaluation set is an intermediate image which is difficult to determine, consistency is lost in the criterion for determination of the user who generates the evaluation set, so that an erroneous label may be set. In such a case, the learning apparatus 1 provides the user with an opportunity of correction through the display unit 16, and corrects the erroneous label for the evaluation set in response to the user input to the input unit 17. As a consequence, the consistency of the labels is ensured, so that the quality of the data set used as an evaluation set is improved.

The input unit 17 outputs to the update unit 18 the information indicating the corrected label received from the user.

(Update Unit 18)

The update unit 18 has a function to update the data set used as an evaluation set to reflect the correction received from the input unit 17. More specifically, the update unit 18 sets the label corrected by the input unit 17 for the incorrect image included in the evaluation set, and overwrites the label in the storage unit 12. As a consequence, the data set which is used as an evaluation set and which has the label corrected is stored in the storage unit 12 with an improved quality.

(Control Unit 11)

The control unit 11 functions as an arithmetic device and a control device to control all of the operating processes in the learning apparatus 1 in accordance with various kinds of programs. For example, the control unit 11 is implemented by a processor, such as central processing units (CPUs) and microprocessors. The control unit 11 may include a read only memory (ROM) for storing programs and arithmetic parameters to be used, and a random access memory (RAM) for temporarily storing parameters and the like that arbitrarily change.

The control unit 11 according to the present embodiment updates the data sets, while alternately exchanging the data set used as a teacher set and the data set used as an evaluation set. Hereinafter, the control operation by the control unit 11 will be described with one data set, out of two data sets stored in the storage unit 12, being defined as a first data set while the other data set being defined as a second data set.

First, the control unit 11 performs learning that uses the first data set as a teacher set as described in the foregoing, and then performs evaluation by using the second data set as an evaluation set. The control unit 11 then updates the labels of the second data set. Specifically, the control unit 11 first controls learning of a dictionary performed with use of the first data set by the learning unit 13. Next, the control unit 11 controls prediction of the labels for the second data set performed with the learned dictionary by the sorting unit 14, and then controls evaluation by the evaluation unit 15 and display of the evaluation result by the display unit 16. The control unit 11 then controls reception of label correction for the second data set by the input unit 17 and overwriting of the corrected label. A series of such processing including learning, evaluation and updating are also referred to as re-labeling processing. The re-labeling processing improves the quality of the second data set.

Next, the control unit 11 controls re-labeling processing (first re-labeling processing) by using the second data set updated by the re-labeling processing as a teacher set and the first data set as an evaluation set, and updates the labels of the first data set. The re-labeling processing improves the quality of the first data set.

Furthermore, the control unit 11 controls re-labeling processing (second re-labeling processing) by using the first data set updated by the re-labeling processing as a teacher set and the second data set updated by the previous re-labeling processing as an evaluation set, and updates the labels of the second data set. The re-labeling processing further improves the quality of the second data set.

The control unit 11 repeats the described re-labeling processing while alternately exchanging the data set used as a teacher set and the data set used as an evaluation set. As a consequence, the control unit 11 can gradually enhance the quality of the first data set and the second data set. Moreover, since the prediction accuracy is enhanced and the number of incorrect images decreases with the improved quality of the data set, the number of the incorrect images displayed on the display unit 16 decreases. As the re-labeling processing is repeatedly executed, the frequency of the user being encouraged to correct the incorrect images decreases, so that a load of the user who corrects the labels is reduced. Furthermore, the user is repeatedly encouraged to correct only the intermediate images relating to the contradicted criterion for determination, the user can easily notice the error of one's own determination. On the contrary, in the case where simply the prediction by the sorting unit 14 is incorrect, the user can strengthen the consistency of one's own criterion for determination by repeatedly making the determination that the labels set by the user his/herself for the intermediate images are correct. As the contradicted criterion for determination of the user is corrected and consistency is established during repeated execution of the re-labeling processing, the incorrect images erroneously determined as correct images may sometimes be correctly re-evaluated as incorrect images. In that case, since the user can correct the labels based on the criterion for determination which becomes consistent during repeated processing, the quality of the data set is further improved.

The control unit 11 alternately repeats the re-labeling processing until the input unit 17 no longer receives label correction. The phrase "until the input unit 17 no longer receives label correction" refers to the case where the re-labeling processing has converged, that is, for example, the case where the user no longer corrects any label of the incorrect images even though re-labeling processing is repeated. In other words, that is the case where, while the user's criterion for determination is consistent, sufficient learning is not achieved and prediction accuracy is no longer enhanced because of such reasons as the amount of images used as a teacher set or an evaluation set being small, or a lack of diversity due to biased subjects. Another case where the re-labeling processing has converged is the case where all the images included in the data set used as a teacher set or an evaluation set become correct images.

The control unit 11 may add a new data set (third data set) to at least either the data set used as a teacher set or the data set used as an evaluation set to increase the amount of data for use in learning by the learning unit 13. Even when the re-labeling processing converges, there is a case where prediction with the accuracy level of 100% is not achieved due to such reasons as the amount of images being small or a lack of diversity of images due to biased subjects and so there is a room for improvement in the prediction accuracy. In such a case, by adding a new data set, the control unit 11 can increase the amount of learning and enhance the diversity, so that the prediction accuracy can be improved. The control unit 11 can also efficiently enhance the prediction accuracy by adding a data set which complements biased data sets which have been used as a teacher set or as an evaluation set.

This concludes the description of the configuration of the learning apparatus 1. Next, the operation processing of the learning apparatus 1 will be described with reference to FIGS. 4 to 7.

[2-2. Operation Processing]
[2-2-1. Improvement in Quality of Data Set]

Figure 4:
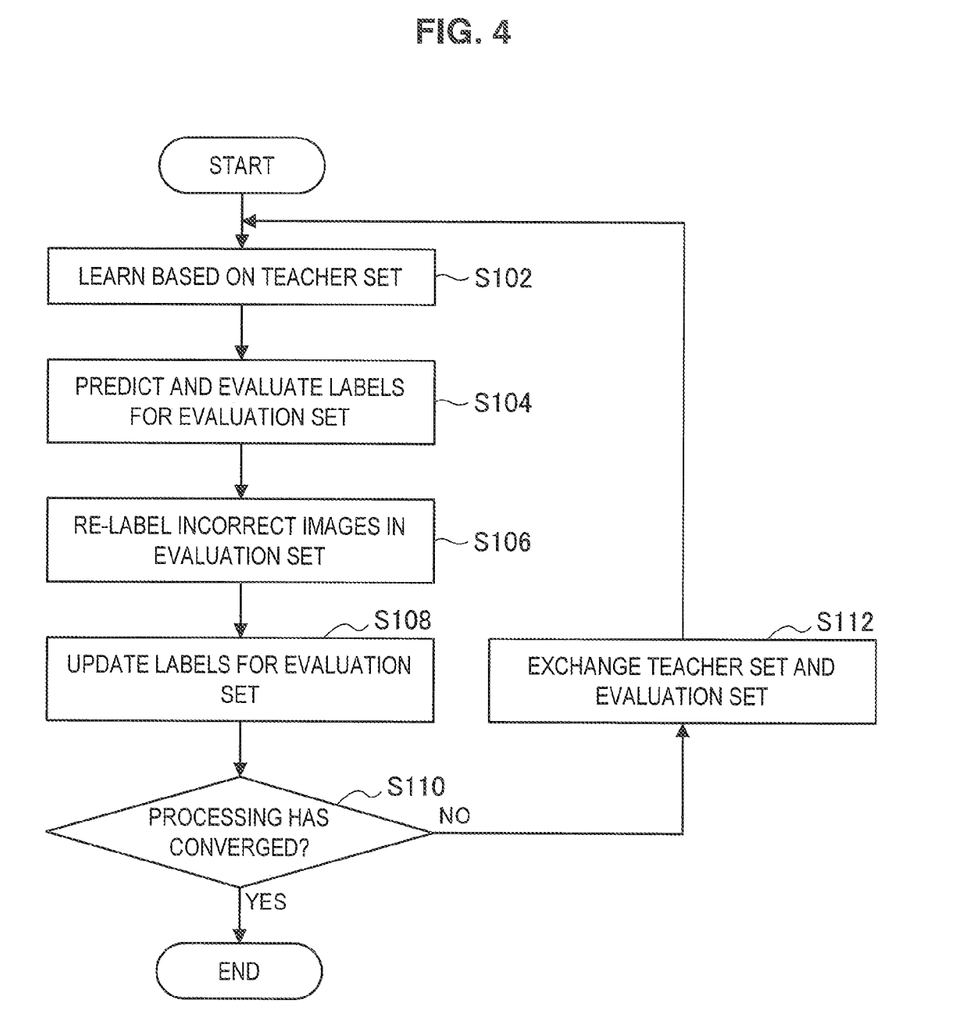
FIG. 4 is a flow chart illustrating operation of the learning apparatus according to the first embodiment.
Figure 5:
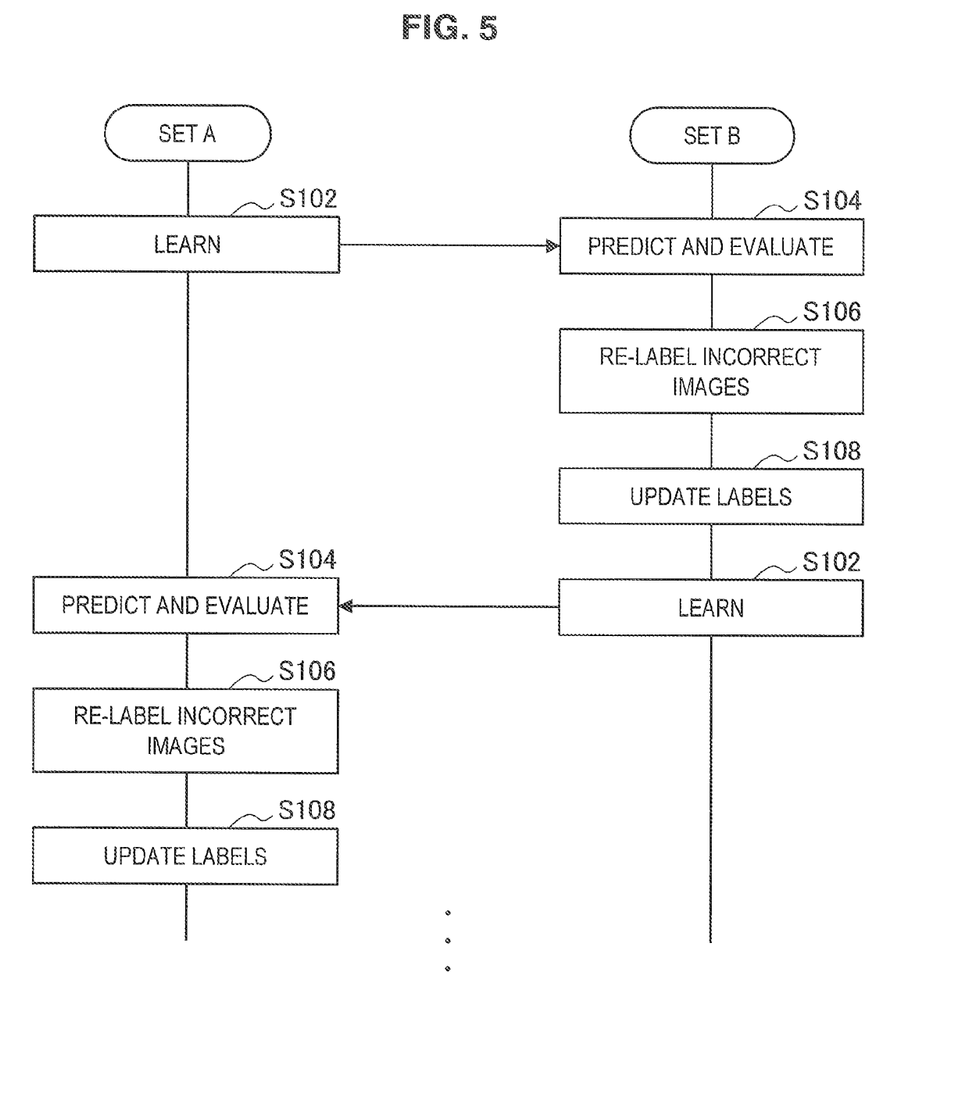
FIG. 5 is an explanatory view illustrating operation of the learning apparatus according to the first embodiment.

FIG. 4 is a flow chart illustrating operation of the learning apparatus 1 according to the first embodiment. FIG. 5 is an explanatory view illustrating operation of the learning apparatus 1 according to the first embodiment. FIG. 5 illustrates which data set, a set A or a set B, is used for each processing in the flow chart illustrated in FIG. 4, in the case of an example assumed to use the set A and the set B as two data sets which are used as a teacher set or an evaluation set.

As illustrated in FIG. 4, the learning apparatus 1 first performs learning based on the teacher set in step S102. Specifically, the learning unit 13 performs learning of a dictionary by supervised learning that uses the data set stored in the storage unit 12 as a teacher set. For example, when the set A and the set B are used as a teacher set or an evaluation set as illustrated in FIG. 5, the learning unit 13 performs learning of the dictionary by supervised learning that uses the set A as a teacher set.

Next, the learning apparatus 1 performs prediction and evaluation of labels for the evaluation set in step S104. Specifically, first, the sorting unit 14 sorts a data set, which is different from the data set used as a teacher set, as an evaluation set, based on the dictionary learned by the learning unit 13, and predicts corresponding labels. Then, the evaluation unit 15 evaluates whether the labels set for the images in the evaluation set match the predicted labels. For example, in the example illustrated in FIG. 5, the sorting unit 14 predicts labels for the set B used as an evaluation set, and the evaluation unit 15 compares the labels preset for respective images included in the set B with the predicted labels, and generates a confusion matrix. In one example, assume that the evaluation unit 15 generates a confusion matrix illustrated in Table 1 below.

TABLE 1

|  |  | Predicted label | | |
| --- | --- | --- | --- | --- |
|  |  | Class A | Class B | Class C |
| Evaluation label | Class A | 56 | 5 | 6 |
|  | Class B | 11 | 77 | 2 |
|  | Class C | 1 | 3 | 64 |

The evaluation labels in Table 1 are labels preset for the images in the evaluation set, and the predicted labels are labels predicted by the sorting unit 14. The numbers of the correct images whose evaluation labels match the predicted labels are shown in columns on a diagonal line of Table 1, the numbers being 56 in class A, 77 in class B, and 64 in class C. The numbers of incorrect images are not 0 as shown in columns outside the diagonal line, which signifies that the prediction accuracy is not 100%.

Next, the learning apparatus 1 performs re-labeling of the incorrect images in the evaluation set in step S106. Specifically, first, the display unit 16 displays only the incorrect images to encourage the user to correct the labels. When the user who sees the incorrect images displayed by the display unit 16 determines that the labels set for the incorrect images are erroneous, the user inputs to the input unit 17 correction of labels for the evaluation set. On the contrary, if the user determines that the prediction by the sorting unit 14 is erroneous, the user does not correct the labels of the evaluation set. For example, in the example illustrated in FIG. 5, the display unit 16 displays incorrect images among the images included in the set B, and the user inputs to the input unit 17 label correction for the incorrect images included in the set B. An example of the confusion matrix after the labels are corrected by the user is illustrated in Table 2.

TABLE 2

|  |  | Predicted label | | |
| --- | --- | --- | --- | --- |
|  |  | Class 1 | Class 2 | Class 3 |
| Evaluation label | Class 1 | 61 | 3 | 3 |
|  | Class 2 | 7 | 81 | 2 |
|  | Class 3 | 1 | 1 | 66 |

As illustrated in Table 2, the numbers of correct images whose evaluation labels match the predicted labels after correction are 61 in class A, 81 in class B, and 66 in class C. The numbers are each increased from the numbers indicated in Table 1. The increments indicate the numbers of incorrect images whose evaluation labels were corrected since the user determined that their evaluation labels were erroneous and their predicted labels were correct. The numerical values in the columns outside the diagonal line represent the numbers of incorrect images whose evaluation labels were not corrected since the user determined that their evaluation labels are correct and their predicted labels were erroneous.

The learning apparatus 1 then updates the labels for the evaluation set in step S108. Specifically, the update unit 18 sets the labels corrected by the input unit 17 for the incorrect images included in the evaluation set, and overwrites the labels in the storage unit 12. For example, in the example illustrated in FIG. 5, the update unit 18 sets and overwrites the corrected labels for the incorrect images included in the set B. As a consequence, the quality of the set B is improved.

Next, the learning apparatus 1 determines whether or not the re-labeling processing has converged in step S110. Specifically, the control unit 11 determines that the re-labeling processing has converged when the input unit 17 no longer receives label correction. For example, when the user no longer correct any label even though the re-labeling processing is repeated, and/or when all the images in the data set used as a teacher set or an evaluation set become correct images, the control unit 11 determines that the re-labeling processing has converged. On the contrary, the control unit 11 determines that the re-labeling processing has not yet converged when the input unit 17 receives label correction.

When it is determined that the re-labeling processing has not yet converged (S110/NO), the learning apparatus 1 exchange the teacher set and the evaluation set in step S112. Specifically, the control unit 11 uses the data set, which was used as a teacher set in the processing in steps S102 to S108, as an evaluation set while using the data set, which was used as an evaluation set, as a teacher set. Then, the processing returns to step S102 again, and the processing (re-labeling processing) from the step S102 to S108 is repeated until the processing converges. The contradiction in the user's criterion for determination is corrected to be consistent by repetition of such a re-labeling processing, and the quality of the data set is improved by label correction based on the consistent criterion for determination.

When it is determined that the re-labeling processing has converged (S110/YES), the learning apparatus 1 ends processing. Since the re-labeling processing has converged, the quality of the data sets used as a teacher set or an evaluation set is improved.

This concludes the description of the operation relating to improvement in quality of the data sets by the learning apparatus 1.

[2-2-2. Addition of New Data Set]

The learning apparatus 1 can generate a high quality data set by the aforementioned processing. However, there is a case where prediction with the accuracy of 100% is not achieved because of such reasons as the amount of images being small or a lack of diversity due to biased subjects and therefore there is a room for improvement in the prediction accuracy. In such a case, by adding a new data set, the learning apparatus 1 can increase the amount of learning and enhance the diversity, so as to improve the prediction accuracy. Hereinafter, the operation relating to addition of a new data set by the learning apparatus 1 will be described with reference to FIGS. 6 and 7.

Figure 6:
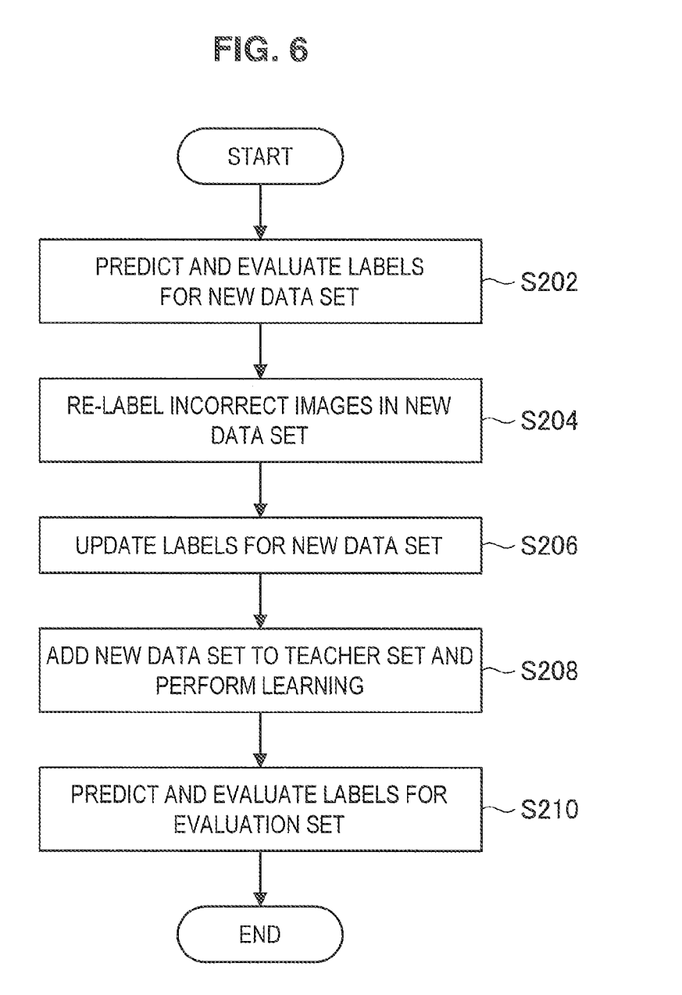
FIG. 6 is a flow chart illustrating operation of the learning apparatus according to the first embodiment.
Figure 7:
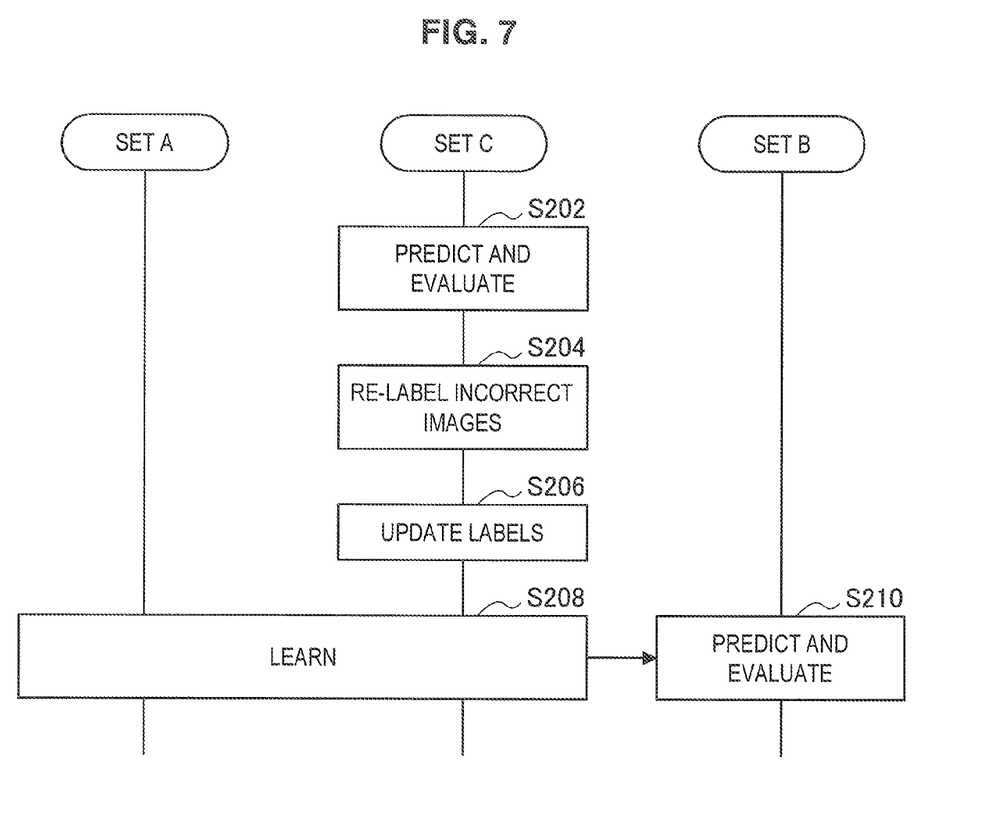
FIG. 7 is an explanatory view illustrating operation of the learning apparatus according to the first embodiment.

FIG. 6 is a flow chart illustrating operation of the learning apparatus 1 according to the first embodiment. FIG. 7 is an explanatory view illustrating operation of the learning apparatus 1 according to the first embodiment. FIG. 7 illustrates which data set is used for each processing in the flow chart illustrated in FIG. 6, in the case of an example assumed to use a set C as a new data set. The set A and the set B illustrated in FIG. 7 are assumed to be data sets whose quality is improved by the processing described above with reference to FIG. 4 and FIG. 5.

As illustrated in FIG. 6, the learning apparatus 1 predicts and evaluates labels for a new data set in step S202. For example, as illustrated in FIG. 7, the sorting unit 14 first performs prediction and the labels for the set C used as an evaluation set with the dictionary learned with the set A as a teacher set. Then, the evaluation unit 15 evaluates whether the labels preset for the set C match the predicted labels.

Next, the learning apparatus 1 re-labels incorrect images in the new data sets in step S204. For example, in the example illustrated in FIG. 7, the display unit 16 displays incorrect images among the images included in the set C, and the user inputs to the input unit 17 correction of labels for the incorrect images included in the set C.

Next, the learning apparatus 1 updates the labels for the new data set in step S206. For example, in the example illustrated in FIG. 7, the update unit 18 sets the labels corrected by the input unit 17 for the incorrect images included in the set C, and overwrites the labels in the storage unit 12. As a consequence, the quality of the set C is improved.

Next, the learning apparatus 1 adds the new data set to the teacher set and performs learning in step S208. Specifically, the learning unit 13 adds the new data set to the data set used as a teacher set and performs learning. In the example illustrated in FIG. 7, the learning unit 13 adds the new set C to the set A, that is, uses the set A and the set C as teacher sets to performs learning of the dictionary by supervised learning.

The learning apparatus 1 then predicts and evaluates the labels for the evaluation set in step S210. For example, in the example illustrated in FIG. 7, the sorting unit 14 predicts labels for the set B used as an evaluation set, and the evaluation unit 15 compares the labels preset for respective images included in the set B with the predicted labels and generates a confusion matrix. Although the quality of the set B has already been improved by the processing described above with reference to FIG. 4 and FIG. 5, the set C increases the amount of data used for learning and enhances diversity. Accordingly, when prediction of the set B is performed with the dictionary learned by using the set A and the set C as teacher sets, the number of incorrect images decreases as compared with the case where prediction of the set B is performed with the dictionary learned by using only the set A as a teacher set. In other words, the prediction accuracy is improved by addition of a new data set.

This concludes the description of the operation processing of the learning apparatus 1.

3. CONCLUSION

As described in the foregoing, the learning apparatus 1 according to an embodiment of the present disclosure can improve the quality of the labels for use in supervised learning. Specifically, by repeating the re-labeling processing while alternately exchanging a teacher set and an evaluation set, the learning apparatus can make the user's criterion for determination consistent and can provide consistent labels for the teacher set and the evaluation set.

Although preferred embodiments of the present disclosure have been described in detail with reference to the accompanying drawings, the technical scope of the present disclosure is not limited to the examples disclosed. It should be understood by those skilled in the art that various modifications, combinations, sub-combinations and alterations may occur depending on design requirements and other factors insofar as they are within the scope of the appended claims or the equivalents thereof.

For example, although the learning apparatus 1 has been described as one apparatus in the embodiments disclosed, the present technology is not limited to these examples. For example, the respective component members included in the learning apparatus 1 may respectively be included in different apparatuses. The learning apparatus 1 may not incorporate the learning unit 13. The learning apparatus 1 may repeat the re-labeling processing while transmitting the teacher set to an external device that has the learning unit 13 and receiving a learning result. In addition, a personal computer (PC) may function as the display unit 16 and the input unit 17, and a Web server may function as the control unit 11, the storage unit 12, the sorting unit 14, the evaluation unit 15, and the update unit 18. In that case, for example, the user operates the PC at home and repeats the re-labeling processing on the Web so as to correct the labels of photographs.

Moreover, when users purchase and use dictionaries generated by corporations and the like, further learning may not be performed by the users personally in most cases. However, according to the present disclosure, users can generate dictionaries dedicated for themselves personally by performing additional learning by the learning apparatus 1.

Furthermore, it is possible to generate a computer program which makes a hardware, such as a CPU, a ROM, and a RAM, incorporated in an information processing apparatus, demonstrate the functions equivalent to respective component members of the above-described learning apparatus 1. A recording medium recording the computer program is also provided.

Moreover, the effects stated in this specification are merely explanatory or exemplary and are not intended to be restrictive. In other words, the technology according to the present disclosure can demonstrate other effects which are apparent from the description of this specification for those skilled in the art, together with or in place of the above-described effects.

Additionally, the present technology may also be configured as below.

(1)
An information processing apparatus including:
 a sorting unit configured to sort a second data set as evaluation data with a classifier generated by learning through supervised learning that uses a first data set as a supervision signal;
 an input unit configured to receive label correction for the second data set in accordance with a sorting result from the sorting unit; and
 an update unit configured to update the second data set to reflect the correction received by the input unit.
(2)
The information processing apparatus according to (1), wherein
 the first data set and the second data set are sets of sorting objects to which labels are set,
 the sorting unit sorts the sorting objects and predicts corresponding labels, and
 the input unit receives correction of a label set for at least one of the sorting objects when the label set for the at least one of the sorting objects is different from the label predicted by the sorting unit.
(3)
The information processing apparatus according to (2), further including:
 an output unit configured to output information indicating the sorting object whose set label is different from the label predicted by the sorting unit.
(4)
The information processing apparatus according to (2) or (3), further including:
 an evaluation unit configured to evaluate the sorting result with a confusion matrix that compares the labels set for the sorting objects and the labels predicted by the sorting unit.
(5)
The information processing apparatus according to any one of (1) to (4), further including:
 a control unit configured to control first re-labeling processing including
  sorting the first data set as evaluation data with the classifier generated by learning through the supervised learning that uses, as the supervision signal, the second data set updated by the update unit,
  receiving label correction for the first data set by the input unit, and
  updating the first data set by the update unit.
(6)
The information processing apparatus according to (5), wherein
 the control unit controls second re-labeling processing including
  sorting the second data set as evaluation data with the classifier generated by learning through the supervised learning that uses, as the supervision signal, the first data set updated by the first re-labeling processing,
  receiving label correction for the second data set by the input unit, and
  updating the second data set by the update unit.
(7)
The information processing apparatus according to (6), wherein
 the control unit alternately repeats the first re-labeling processing and the second re-labeling processing.

(8)
The information processing apparatus according to (7), wherein
 the control unit alternately repeats the first re-labeling processing and the second re-labeling processing until the input unit no longer receives label correction.
(9)
The information processing apparatus according to any one of (5) to (8), wherein
 the control unit adds a third data set to at least one of the first data set and the second data set.
(10)
The information processing apparatus according to any one of (1) to (9), further including:
 a learning unit configured to perform learning of the classifier through the supervised learning that uses the first data set or the second data set as the supervision signal.
(11)
The information processing apparatus according to any one of (2) to (10), wherein
 the sorting objects are moving images, static images, or sounds and other contents.
(12)
A method for information processing executed by a processor of an information processing apparatus, the method including:
 sorting a second data set as evaluation data with a classifier generated by learning through supervised learning that uses a first data set as a supervision signal;
 receiving label correction for the second data set in accordance with a sorting result; and
 updating the second data set to reflect the received correction.

What is claimed is:
1. An information processing apparatus, comprising:
 one or more processors configured to:
  sort a first data set as a supervision signal;
  conduct a supervised learning process based on the first data set to generate a classifier, wherein the first data set is a first set of pairs of data;
  sort a second data set as an evaluation signal;
  predict a second plurality of preset labels for the second data set based on the classifier, wherein the second data set is a second set of pairs of data;
  receive a first input;
  relabel a specific preset label of the second plurality of preset labels for one pair of data of the second data set based on
   the received first input, and
   an inconsistency between the specific preset label and a corresponding predicted specific preset label of the predicted second plurality of preset labels;
  update the second data set to reflect the relabeled specific preset label, wherein the second data set is updated based on the received first input; and
  control a first re-labelling process that conducts the supervised learning process based on the updated second data set to generate the classifier.
2. The information processing apparatus according to claim 1, wherein
 the first input corresponds to correction of one of the second plurality of preset labels.
3. The information processing apparatus according to claim 2, wherein the one or more processors are further configured to
 output information that indicates at least one pair of data of the second data set, wherein the second data set has one of the second plurality of preset labels different from one of the predicted second plurality of preset labels.

4. The information processing apparatus according to claim 2, wherein the one or more processors are further configured to
evaluate a sorting result with a confusion matrix, wherein the confusion matrix compares the second plurality of preset labels with the predicted second plurality of preset labels.

5. The information processing apparatus according to claim 2, wherein
each of the first set of pairs of data and each of the second set of pairs of data comprise at least one of at least one moving image, at least one static image, or at least one sound.

6. The information processing apparatus according to claim 1, wherein the one or more processors are further configured to:
control the first re-labelling process that:
sorts the first data as the evaluation signal based on the classifier;
predicts a first plurality of preset labels for the first data set;
receives a second input to relabel the first plurality of preset labels for the first data set; and
updates the first data set based on the received second input.

7. The information processing apparatus according to claim 6, wherein the one or more processors are further configured to control a second re-labelling process that:
conducts the supervised learning process based on the updated first data set and the updated second data set to generate the classifier, wherein
the updated first data set is based on the first re-labelling process, and
the updated first data set corresponds to the supervision signal;
sorts the second data set as the evaluation signal based on the classifier;
receives a third input to relabel the second plurality of preset labels for the updated second data set; and
updates the updated second data set based on the received third input.

8. The information processing apparatus according to claim 7, wherein the one or more processors are further configured to
alternately repeat the first re-labelling process and the second re-labelling process.

9. The information processing apparatus according to claim 8, wherein the one or more processors are further configured to
alternately repeat the first re-labelling process and the second re-labelling process until the reception of one of the first input or the second input.

10. The information processing apparatus according to claim 7, wherein the one or more processors are further configured to:
generate a new data set based on addition of a third data set to at least one of the updated first data set or the updated second data set to increase prediction accuracy of the supervised learning process.

11. The information processing apparatus according to claim 7, wherein
the one or more processors are further configured to conduct the supervised learning process of the classifier based on one of the updated first data set or the updated second data set, and
the one of the updated first data set or the updated second data set corresponds to the supervision signal.

12. The information processing apparatus according to claim 1, wherein the one or more processors are further configured to:
extract a feature value of each pair of data of the first data set and each pair of data of the second data set;
set a first plurality of preset labels to the first data set; and
set the second plurality of preset labels to the second data set, wherein
each of the first plurality of preset labels and each of the second plurality of preset labels are set based on a parameter, and
the parameter describes an association between extracted feature value of the each pair of data of the first data set and the each pair of data of the second data set, and a corresponding preset label of one of the first plurality of preset labels or the second plurality of preset labels.

13. A non-transitory computer readable medium having stored thereon computer-executable instructions, which when executed by a computer, cause the computer to execute operations, the operations comprising:
sorting a first data set as a supervision signal;
conducting a supervised learning process based on the first data set to generate a classifier, wherein the first data set is a first set of pairs of data;
sorting a second data set as an evaluation signal;
predicting a plurality of preset labels for the second data set based on the classifier, wherein the second data set is a second set of pairs of data;
receiving an input;
relabeling a preset label of the plurality of preset labels for one pair of data of the second data set based on
the received input, and
an inconsistency between the preset label and a predicted preset label of the predicted plurality of preset labels;
updating the second data set to reflect the relabeled preset label, wherein the second data set is updated based on the received first input; and
controlling a re-labelling process that conducts the supervised learning process based on the updated second data set to generate the classifier.

* * * * *